(12) United States Patent
Kim et al.

(10) Patent No.: US 9,402,239 B2
(45) Date of Patent: *Jul. 26, 2016

(54) METHOD AND APPARATUS OF TRANSMIT POWER CONTROL IN WIRELESS LOCAL AREA NETWORK

(71) Applicant: LG Electronics Inc., Seoul (KR)

(72) Inventors: Eun Sun Kim, Gyeongki-do (KR); Yong Ho Seok, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,361

(22) Filed: Nov. 17, 2015

(65) Prior Publication Data

US 2016/0073358 A1    Mar. 10, 2016

Related U.S. Application Data

(63) Continuation of application No. 13/940,324, filed on Jul. 12, 2013, now Pat. No. 9,215,599, which is a continuation of application No. 13/018,580, filed on Feb. 1, 2011, now Pat. No. 8,509,173.

(60) Provisional application No. 61/300,805, filed on Feb. 2, 2010, provisional application No. 61/321,508, filed on Apr. 7, 2010.

(30) Foreign Application Priority Data

Jul. 12, 2010    (KR) .................. 10-2010-0066804
Oct. 26, 2010    (KR) .................. 10-2010-0104910

(51) Int. Cl.
H04W 4/00       (2009.01)
H04B 7/216     (2006.01)

(Continued)

(52) U.S. Cl.
CPC ............ *H04W 52/346* (2013.01); *H04W 16/14* (2013.01); *H04W 52/243* (2013.01); *H04W 52/36* (2013.01); *H04W 52/38* (2013.01)

(58) Field of Classification Search
CPC ............................ H04W 84/12; H04W 48/16
See application file for complete search history.

(56) References Cited

U.S. PATENT DOCUMENTS 8,130,708 B2    3/2012    Singh
8,203,987 B2    6/2012    Ishii et al.

(Continued)

FOREIGN PATENT DOCUMENTS

CN    101409921 A    4/2009
CN    101448308 A    6/2009

(Continued)

OTHER PUBLICATIONS

European Search Report issued in European Patent Application No. 11740042.4 on Jul. 10, 2015.

(Continued)

*Primary Examiner* — Melanie Jagannathan

(74) *Attorney, Agent, or Firm* — Morgan, Lewis & Bockius LLP

(57) ABSTRACT

A method and apparatus of controlling a transmit power in a wireless local area network is provided. A wireless device operated in a TV White Space transmits a white space map indicating a list of available channels, and transmits an extended power constraint indicating a plurality of transmission channels and a plurality of maximum transmit powers, wherein the plurality of transmission channels are selected among the list of available channels and each of the plurality of maximum transmit powers corresponds to a maximum transmit power for each of the plurality of transmission channels. Interference can be mitigated between wireless devices operated in the TV White Space.

20 Claims, 12 Drawing Sheets

(51) Int. Cl.
  *H04W 72/00* (2009.01)
  *H04W 52/34* (2009.01)
  *H04W 52/24* (2009.01)
  *H04W 52/36* (2009.01)
  *H04W 16/14* (2009.01)
  *H04W 52/38* (2009.01)

(56) References Cited

U.S. PATENT DOCUMENTS

| | | | |
|---|---|---|---|
| 2002/0168993 | A1 | 11/2002 | Choi et al. |
| 2004/0017905 | A1 | 1/2004 | Warrier et al. |
| 2004/0127240 | A1 | 7/2004 | Li |
| 2004/0137905 | A1* | 7/2004 | Jeong ............ H04W 48/16 455/450 |
| 2004/0180652 | A1 | 9/2004 | Jang et al. |
| 2005/0059422 | A1 | 3/2005 | Rudolf et al. |
| 2006/0018284 | A1 | 1/2006 | Rudolf et al. |
| 2007/0049239 | A1 | 3/2007 | Joung et al. |
| 2007/0178927 | A1 | 8/2007 | Fernandez-Corbaton et al. |
| 2008/0144582 | A1 | 6/2008 | Das et al. |
| 2008/0304444 | A1 | 12/2008 | Soomro |
| 2009/0086861 | A1 | 4/2009 | Yavuz et al. |
| 2009/0280748 | A1 | 11/2009 | Shan et al. |
| 2010/0118805 | A1 | 5/2010 | Ishii et al. |
| 2010/0311452 | A1 | 12/2010 | Li et al. |
| 2011/0306375 | A1 | 12/2011 | Chandra et al. |
| 2012/0093092 | A1 | 4/2012 | Kasslin et al. |

FOREIGN PATENT DOCUMENTS

| | | |
|---|---|---|
| JP | 2008-506297 A | 2/2008 |
| JP | 2011-520377 A | 7/2011 |
| KR | 10-2004-0081518 A | 9/2004 |
| KR | 10-2007-0025379 A | 3/2007 |
| WO | 02/091623 A | 11/2002 |
| WO | 2006/006138 A1 | 1/2006 |
| WO | 2008/123148 A1 | 10/2008 |
| WO | 2009/039443 A2 | 3/2009 |
| WO | 2009/136760 A1 | 11/2009 |

OTHER PUBLICATIONS

International Search Report issued in counterpart International Application No. PCT/KR2011/000750 dated Sep. 30, 2011.

Office Action dated Jun. 9, 2014, issued by the State Intellectual Property Office of China in Chinese Patent Application No. 201180008133.8.

* cited by examiner

METHOD AND APPARATUS OF TRANSMIT POWER CONTROL IN WIRELESS LOCAL AREA NETWORK

CROSS REFERENCE TO RELATED APPLICATIONS

The present application is a continuation of U.S. patent application Ser. No. 13/940,324, filed on Jul. 12, 2013, which is a continuation of U.S. patent application Ser. No. 13/018,580, filed on Feb. 1, 2011, which claims the benefit of priority of U.S. Provisional Application No. 61/300,805, filed on Feb. 2, 2010; U.S. Provisional Application No. 61/321,508, filed on Apr. 7, 2010; Korean Patent Application No. 10-2010-0066804, filed on Jul. 12, 2010; and Korean Patent Application No. 10-2010-0104910, filed on Oct. 26, 2010, the entire disclosure of each of which is incorporated by reference in its entirety herein for all purposes.

BACKGROUND OF THE INVENTION

1. Field of the Invention

The present invention relates to wireless communications, and more particularly, to a method and apparatus for controlling a transmit power in a wireless local area network.

2. Related Art

With recent development of information and communications technology, various wireless communications technology has been developed. Among them, a wireless local area network (WLAN) is technology that allows portable user equipment such as a personal digital assistant (PDA), a laptop computer, a portable multimedia player (PMP), etc. in a home, an enterprise or a certain service providing zone to have wireless access to high-speed Internet on the basis of radio frequency technology.

It is presupposed that communications in the WLAN based on institute of electrical and electronics engineers (IEEE) 802.11 standards are performed within a zone called a basic service set (BSS). The BSS zone has a somewhat indefinite boundary since it may vary depending on propagating characteristics of a wireless medium. Such a BSS is basically divided into two configurations of an independent BSS (IBSS) and an infrastructure BSS. The former indicates a BSS that forms a self-contained network and does not allows access to a distribution system (DS), and the latter indicates a BSS that includes one or more access points (AP), a distribution system, etc. and generally employs the AP in all communications including communication between stations.

The station (STA) having desire to access a wireless network may use two scanning methods for searching an accessible wireless network (BSS or IBSS), i.e., a candidate AP or the like.

One is passive scanning, which uses a beacon frame transmitted from the AP (or STA). That is, the STA having desire to access a wireless network periodically receives the beacon frames from the AP or the like managing a relevant BSS (or IBSS), thereby finding the accessible BSS or IBSS.

The other is active scanning. The STA having desire to access the wireless network first transmits a probe request frame. Then, the STA or AP that receives the probe request frame responds with a probe response frame.

TV Whitespace includes channels allocated to broadcast TV, which are permitted to be used by cognitive radio device. TV White Space may include UHF band and VHF band. The spectrum (hereinafter, can be called as 'White Space') not used by a licensed device can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. The unlicensed device, which wishes to use the TV White Space (TVWS), shall acquire information for available channel list at its location.

An unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when Digital Television (DTV) Preamble is detected. And, the unlicensed device (station or access point) shall lower its transmit power, when it is detected that the neighboring channel, next to the channel used by the unlicensed device, is used by the incumbent user.

On the other hand, in order to efficiently operate the unlicensed device on TVWS, more discussion is needed on an enabling mechanism of letting the unlicensed device to operate in TVWS, how efficiently the unlicensed device finds the network to be connected, how the information for the available channel in TVWS is efficiently acquired, efficient format of that information, and efficient signaling mechanism to exchange this information, etc.

SUMMARY OF THE INVENTION

A method and apparatus of controlling a transmit power operated in a TV White Space transmits in a wireless local area network is provided.

In an aspect, a method of controlling a transmit power of a wireless device operated in a TV White Space in a wireless local area network is provided. The method includes transmitting, by a first wireless device to a second wireless device, a white space map indicating a list of available channels, and transmitting, by the first wireless device to the second wireless device, an extended power constraint indicating a plurality of transmission channels and a plurality of maximum transmit powers, wherein the plurality of transmission channels are selected among the list of available channels and each of the plurality of maximum transmit powers corresponds to a maximum transmit power for each of the plurality of transmission channels.

The first wireless device and the second wireless device may operate on each transmission channel at a transmit power below a maximum transmit power corresponding to each transmission channel of the plurality of maximum transmit powers.

The method may further include advertising, by the second wireless device, the extended power constraint indicating the plurality of transmission channels and the plurality of maximum transmit powers.

The extended power constraint may be included in a beacon frame.

The method may further include receiving, by the first wireless device from the second wireless device, a probe request frame used for a request for an active scan, and the extended power constraint may be included in a probe response frame as a response of the probe request frame.

In another aspect, a wireless device for controlling a transmit power operated in a TV White Space in a wireless local area network is provided. The wireless device includes a processor configured to acquire a white space map indicating a list of available channels and an extended power constraint indicating a plurality of transmission channels and a plurality of maximum transmit powers, and an interface unit providing a wireless interface and configured to transmit the white space map and the extended power constraint, wherein the processor is configured to select the plurality of transmission channels among the list of available channels, and each of the plurality of maximum transmit powers corresponds to a maximum transmit power for each of the plurality of transmission channels.

Interference can be mitigated between wireless devices operated in a TV White Space.

DESCRIPTION OF EXEMPLARY EMBODIMENTS

Figure 1:
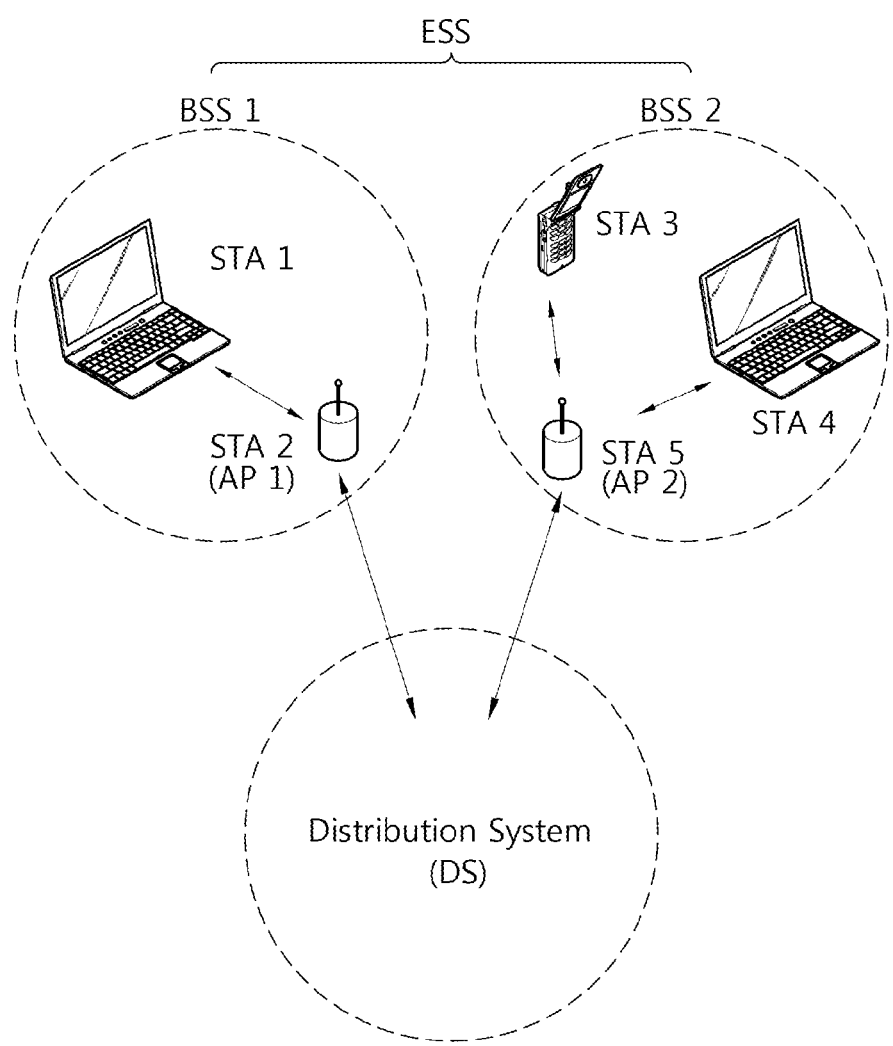
FIG. 1 shows a wireless local area network (WLAN) system to implement the present invention.

FIG. 1 shows a wireless local area network (WLAN) system to implement the present invention.

Referring to FIG. 1, a WLAN system includes one or more basic service set (BSS). The BSS is a group of stations (STA) which can successfully synchronize and communicate with one another, and does not mean a certain zone.

An infrastructure BSS (BSS1, BSS2) includes one or more non-access point (AP) STAs (non-AP STA1, non-AP STA2, non-AP STA2); APs (AP STA1, AP STA2) providing distribution service; and a distribution system (DS) connecting the plurality of APs (AP STA1, AP STA2). In the infrastructure BSS, the AP manages the non AP STAs.

On the other hand, an independent BSS (IBSS) is a BSS that operates in an Ad-Hoc mode. Since the IBSS does not include the AP, there is no centralized management entity that performs centralized management. That is, in the IBSS, the non-AP STAs are managed in a distributed manner. In the IBSS, all STAs may be provided as mobile STAs and constitute a self-contained network since access to the DS is not allowed.

The STA is a predetermined functional medium having a medium access control (MAC) and a physical layer interface for a wireless medium, based on institute of electrical and electronics engineers (IEEE) 802.11 standards, which broadly includes both the AP and the non-AP STA.

The STA may be called a mobile terminal, a wireless device, a wireless terminal, a mobile station (MS), a mobile subscriber unit, or the like.

The AP is a functional entity that provides access to the DS via a wireless medium for the STA associated with the AP. In the infrastructure BSS including the AP, communication between the non-AP STAs is basically performed via the AP, but direct communication between the non-AP STAs may be possible if a direct link is set.

The plurality of infrastructure BSSs may be connected to one another through the distribution system (DS). The plurality of BSSs connected through the DS is called an extended service set (ESS). The STAs included in the ESS can communicate with one another, and the non-AP STAs within one ESS can move from one BSS to another BSS while performing the communication without disconnection.

The DS is a mechanism that enables one AP to communicate with another AP. Through the DS, the AP can transmit a frame for the STAs associated with the BS managed by the AP, transmit a frame when one STA moves to another BSS, or transmit a frame to an external network such as a wired network or the like. The DS is not necessarily a network, but may be achieved without any limitation as long as it can provide predetermined distribution service based on IEEE 802.11. For example, the DS may be a wireless network such as a mesh network, or a physical structure connecting the APs with one another.

In order for an unlicensed device to operate in TVWS such as a frequency domain where the unlicensed device is permitted to operate at a given time in a given geographical area with regard to a licensed device, the unlicensed device should acquire information for available channels in TVWS not used by incumbent users. The most casual approach for this is defining such that all the unlicensed devices performs sensing whether there is a primary signal of the incumbent user on each of the channels in TVWS. However, it may cost huge overhead, thus another approach can be using a regulatory database, such as TV band database which includes information which of the channels are available for the WLAN operation at specific geographic location.

As stated above, the unlicensed device including STA should provide a protection mechanism for the incumbent user. That is, if a specific channel is used by an incumbent user, such as wireless microphone, the unlicensed device should stop using this channel. For that purpose, the unlicensed device can perform spectrum sensing to find whether a specific channel is used by a primary user. Spectrum sensing mechanism, which can be used, includes Energy Detection scheme, Feature Detection scheme, etc.

If the unlicensed device finds that the strength of the primary signal is higher than a predetermined level, or if the unlicensed device detects the Digital Television (DTV) preamble, the unlicensed device may determine that that channel is used by an incumbent user. And, if the unlicensed device determines on a specific channel that the neighboring channel next to the specific channel is used by the incumbent user, the unlicensed device should lower its transmission power to protect the incumbent user.

Figure 2:
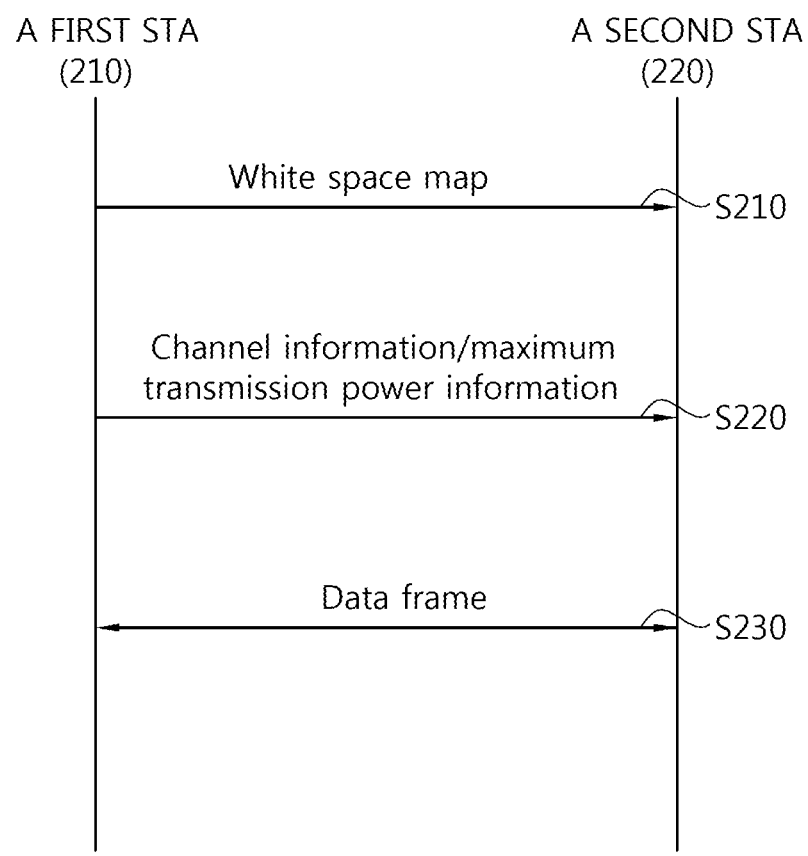
FIG. 2 is a flowchart showing a method of controlling the transmit power according to an exemplary embodiment of the present invention.

FIG. 2 is a flowchart showing a method of controlling the transmit power according to an exemplary embodiment of the present invention.

Referring to FIG. 2, a first STA transmit a white space map to a second STA (S210). The white space map includes a list of identified available channels and/or corresponding maximum allowed transmission powers for each available channel. Actual maximum of transmission power level is decided depending on the channel bandwidth and the maximum allowed transmission powers per available channel. The first STA may generate the white space map based on TV channel information from TV bands database system or its own spectrum sensing.

The first STA transmits channel information and maximum transmit power information to the second STA (S220). The channel information indicates transmission channels selected among the list of available channels. The maximum transmit power information indicates the maximum transmit powers for the transmission channels. The first STA and the STA operate on each transmission channel at a transmit power below a maximum transmit power corresponding to each transmission channel.

Upon receiving the channel information and the maximum transmit power information, the second STA which may be a AP may advertise the channel information and the maximum transmit power information to its dependent STAs.

The first STA and second STA may receive and transmit data frames at the transmission channels (S230).

The channel information and the maximum transmit power may be varied depending on the conditions of the frequency band. Thus, the first STA may update the corresponding information and transmit the updated information to the second STA. To update the channel information and the maximum transmit power information, the first STA may confirm whether other WLAN systems or a different kind of communication systems is using the frequency band, which may be performed by sensing a signal transmitted from other wireless devices. Also, the first STA may acquire information about the state of the usage by accessing a database where the channel information or the maximum transmit power information are updated.

The first STA may send an action frame that contains the channel information and the maximum transmit power information. The action frame may be a beacon frame used for a passive scan or a probe response frame as a response to a probe request frame used for an active scan.

If the channel information and the maximum transmit power information is periodically updated, the updated information may be transmitted as being included in a beacon frame periodically transmitted.

A master device may transmit the channel information and the maximum transmit power information to wireless devices (which is called as dependent devices). The master device may be an AP or a non-AP STA. The master device selects transmission channels and their maximum transmit powers based on a database.

The transmission channels and the maximum transmit powers may be different depending on the types of STA. Thus, the master device may send the type of service-target STA as well as the channel information and the maximum transmit power information.

A STA may perform sensing with regard to each channel of the TV WS band, or may request other STA to report a sensing result.

If the STA can access a database containing information related to a channel state of the TV WS band, the STA can acquire the channel information without performing spectrum sensing.

The STA grasps the state of each channel through the channel information, and shifts to an available channel if a used channel is not available anymore as a licensed user appears. As necessary, the STA may previously set up a preliminary channel to be used when the used channel is not available anymore.

If a certain channel available for the STA is adjacent to a channel being occupied by the licensed user, interference may occur when the STA uses the certain channel. Accordingly, there is a need for a method of mitigating the interference. To this end, there has been proposed a method of constraining a transmit power with regard to a channel to be used by the STA.

Figure 3:
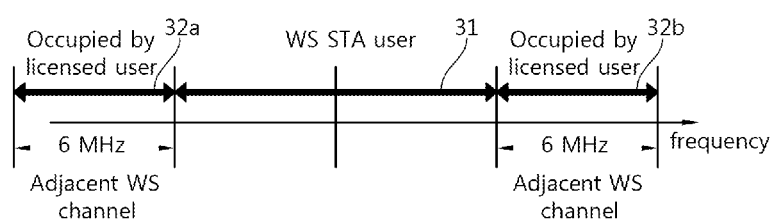
FIG. 3 shows an example of using a channel in a TV WS band.

FIG. 3 shows an example of using a channel in a TV WS band.

In the TV WS, an unlicensed device such as an AP and a STA can generally use about 30 channels each of which has a bandwidth of 6 MHz. As a precondition for using these channels, a certain desired channel has not to be occupied by the licensed user.

Suppose that each of channels 32a and 32b being used by the licensed user has a bandwidth of 6 MHz. In the conventional IEEE 802.11a standard, since the STA supports at least one of 5 MHz, 10 MHz and 20 MHz, let the AP and the STA have a standard channel bandwidth of 5 MHz. Thus, the AP and the STA can support a channel bandwidth of 10 MHz or 20 MHz by regarding 5 MHz as the standard bandwidth, according to how many WS channels are successively unoccupied.

Here, a transmission channel refers to a physical wireless resource that is used by an unlicensed device for transmitting a frame or the like wireless signal in a certain frequency band.

Suppose that the STA can use a central band 31 in the TV WS, the licensed user is occupying both adjacent channels 32a and 32b adjacent to the central band 31, and the central band 31 is a bandwidth of the transmission channel. The STA has to decrease the transmit power of the transmission channel 31 when sensing a signal of the licensed user in the WS channels 32a and 32b adjacent to the transmission channel 31 being used by the STA. This is to reduce the interference with the licensed user.

For example, even though allowable maximum transmit power of the STA is 100 mW, the maximum transmit power may be limited to 40 through 50 mW when the adjacent WS channels 32a and 32b are being occupied by the licensed user. Because of the above, there is no need of directly associating a broader bandwidth of a transmission channel with a higher throughput in consideration of such a transmit power constraint. In some cases, higher transmit power may be more effective instead of using a transmission channel having a relatively narrow bandwidth.

If three WS channels each having the bandwidth of 6 MHz are unoccupied in the TV WS band, an available band is 18 MHz. The STA can transmit and receive a frame through the transmission channel having a bandwidth of 10 MNz in the foregoing band. However, emptiness of three successive WS channels means that the adjacent WS channels at both sides are being occupied by the licensed user. Therefore, when the frame is transmitted using the transmission channel having the bandwidth of 10 MHz, the transmit power has to be constrained to 40 through 50 mW so as to protect the licensed user occupying the adjacent WS channels.

There may be an environment having a high gain when using low transmit power in a broad band, but there may be an environment having a low gain when using high transmit power in a narrow band. Also, if the transmit power is lowered, coverage is reduced and a hidden node problem may arise.

Below, embodiments related to the transmit power constraint for protecting the licensed user will be proposed. For example, the following exemplary embodiments show that the transmission channels used by the STAs have bandwidths of 5 MHz, 10 MHz and 20 MHz, and have a normal allowable maximum transmit power of 100 mW and a constrained maximum transmit power of 40 mW.

Figure 4:
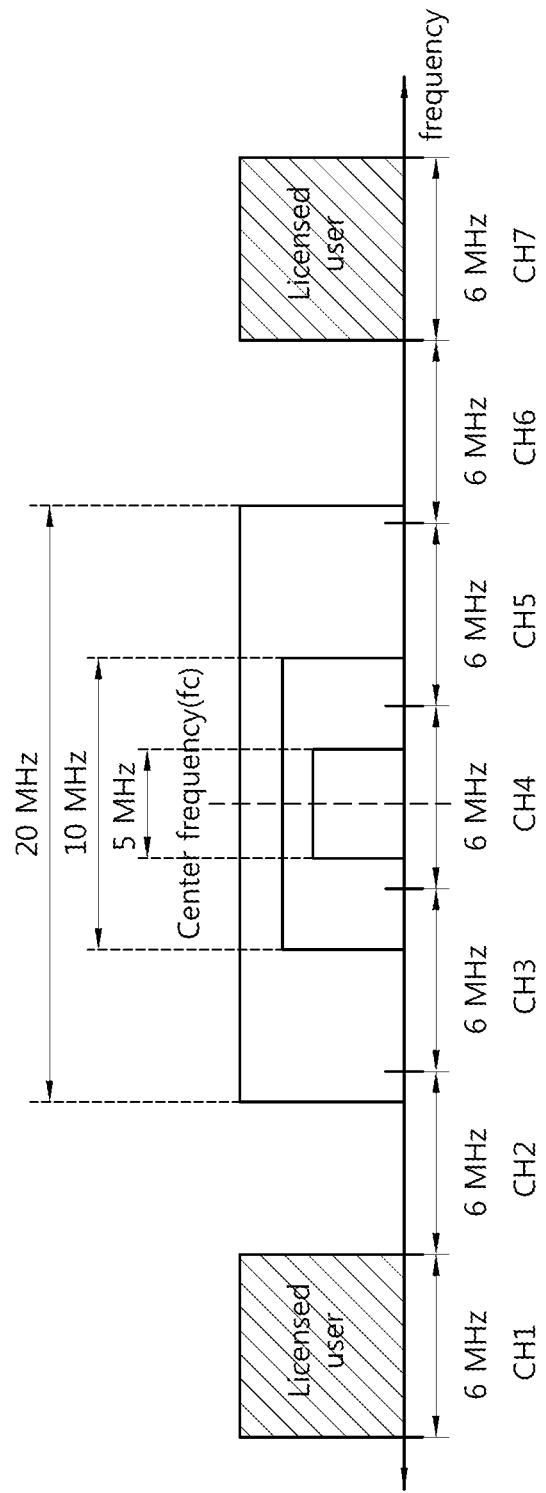
FIG. 4 shows an example of assigning a transmission channel according to an exemplary embodiment of the present invention.

FIG. 4 shows an example of assigning a transmission channel according to an exemplary embodiment of the present invention.

Referring to FIG. 4, suppose that there are seven channels CH1~CH7 in the TV WS band, in which middle channels CH2~CH6 are empty and the licensed user occupies the channels CH1 and CH7.

Because five channels are empty WS channels, an empty frequency band is 30 MHz. With respect to a center frequency $f_c$ in the empty frequency band, the bandwidth available for the STA is at least one of 5 MHz, 10 MHz and 20 MHz.

If the STA uses a transmission channel having a bandwidth of 5 MHz, the maximum transmit power of 100 mW can be used since there is no adjacent channel occupied by the licensed user. Likewise, if the STA uses a transmission channel having a bandwidth of 10 MHz, the maximum transmit power of 100 mW can be used since there is no adjacent channel occupied by the licensed user.

On the other hand, if the STA uses a transmission channel having a bandwidth of 20 MHz, the maximum transmit power is constrained to 40 mW because there is an adjacent WS channel occupied by the licensed user.

Figure 5:
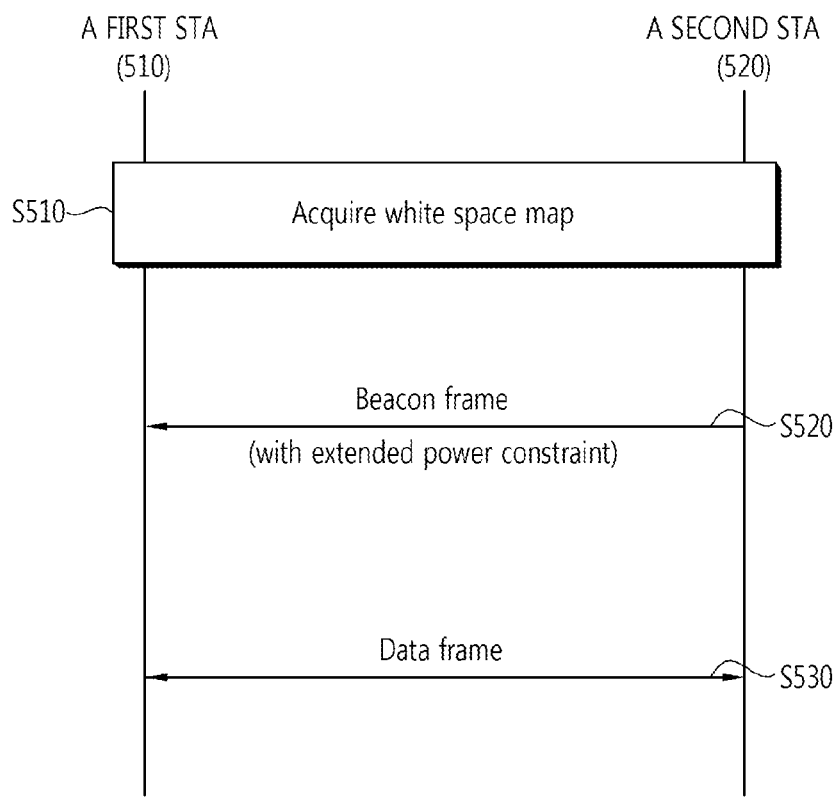
FIG. 5 is a flowchart showing a method for the transmit power constraint according to an exemplary embodiment of the present invention.

FIG. 5 is a flowchart showing a method for the transmit power constraint according to an exemplary embodiment of the present invention.

A first STA 510 and a second STA 520 acquire a white space map (S510). The white space map may be acquired based on TV channel information from TV bands database system or its own spectrum sensing. The second STA 520 which acquires the white space map may send the white space map to the first STA 510.

An unlicensed user having no priority for using the TV WS band confirms whether the licensed user having the priority exists or not through periodic channel sensing, and immediately stops using the currently occupied channel if there exists the licensed user.

The first STA 510 receives a beacon frame including an extended power constraint from the second STA 520 (S520). The beacon frame is a management frame that includes network information of the infrastructure BSS configured by the second STA 520. The second STA may be a AP.

The first STA 510 and second STA 520 may receive and transmit data frames based on the extended power constraint (S530).

The extended power constraint indicates transmission channels and maximum transmit powers. The transmission channels are selected among the list of available channels in the white space map. The first STA 510 can acquire information about WS channels and their power constraints by receiving the beacon frame, and thus determine the maximum allowable transmit power for each transmission channel.

Figure 6:
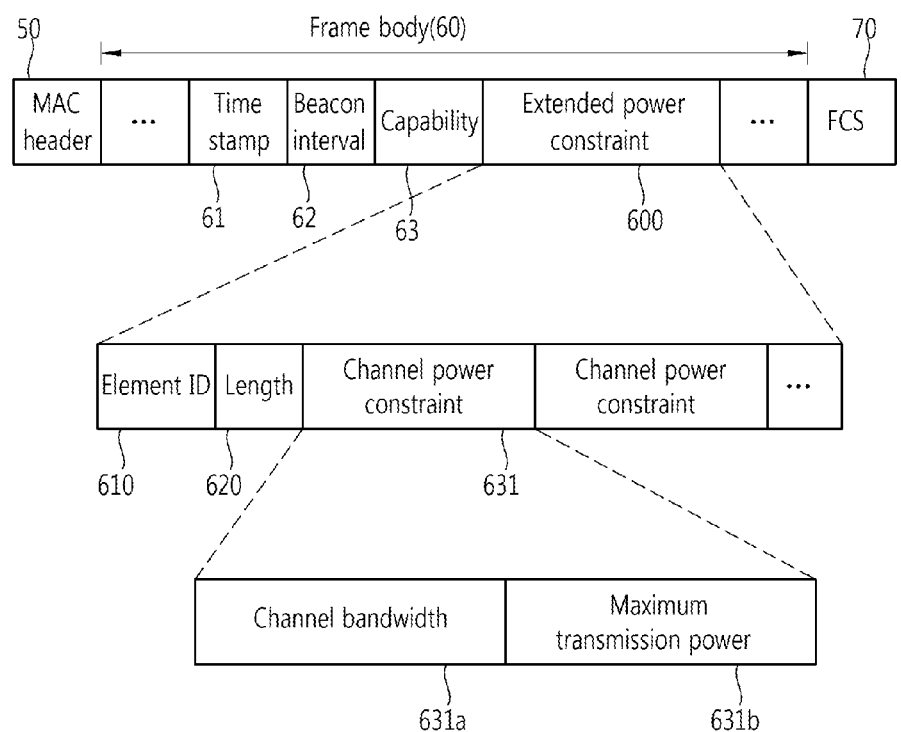
FIG. 6 is a block diagram showing a format of the beacon frame according to an exemplary embodiment of the present invention.

FIG. 6 is a block diagram showing a format of the beacon frame according to an exemplary embodiment of the present invention.

Referring to FIG. 6, a beacon frame includes a media access control (MAC) header 50, a frame body 60, and a frame check sequence (FCS) 70.

The frame body 60 includes a timestamp field 61, a beacon interval field 62, a capability field 63, and an extended power constraint field 600.

The timestamp field 61 includes information used for time synchronization. The beacon interval field 62 includes information about an interval at which the beacon frame is transmitted. The capability field 63 includes information about a condition required for communication between a AP and a STA in the BSS.

The extended power constraint field 600 includes an extended power constraint including information about constraining the transmit power used for each transmission channel. The extended power constraint field 600 may include an element identifier (ID) field 610, a length field 620, and one or more channel power constraint fields 631. In this exemplary embodiment, two channel power constraint fields are shown, but not limited thereto.

The element ID field 610 indicates that a corresponding information element is the extended power constraint. The length field 620 indicates the length of the extended power constraint field 600.

A channel power constraint field 631 includes a channel bandwidth subfield 631a indicating a channel bandwidth of a transmission channel, and a maximum transmit power subfield 631b indicating the maximum transmit power of the transmission channel.

The transmission channel bandwidth subfield 631a denotes a channel bandwidth available for the STA. The maximum transmit power subfield 631b denotes the maximum transmit power allowable in the channel bandwidth indicated by the transmission channel bandwidth subfield 631a.

In the example of FIG. 4, the maximum transmit power of 100 mW may be given to the transmission channel having a bandwidth of 5 MHz, the maximum transmit power of 100 mW may be given to the transmission channel having a bandwidth of 10 MHz, and the maximum transmit power of 40 mW may be given to the transmission channel having a bandwidth of 20 MHz. Thus, the extended power constraint field 600 includes three channel power constraint fields.

On the basis of the extended power constraint, a STA may determine a transmit power of a transmission channel within a range of the maximum transmit power constraint.

Figure 7:
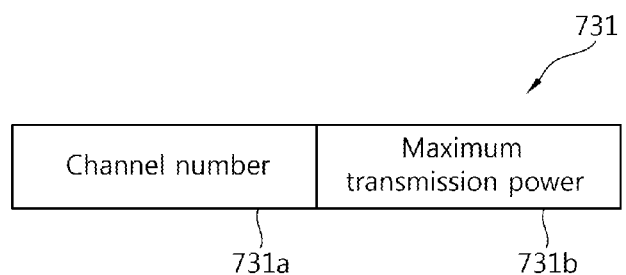
FIG. 7 shows another example of a channel power constraint field.

FIG. 7 shows another example of a channel power constraint field.

A channel power constraint field 731 includes a channel number subfield 731a and a maximum transmit power subfield 731b.

The channel number subfield 731a indicates a channel number used to identify a transmission channel. The maximum transmit power subfield 731b indicates a maximum transmit power allowable to the transmission channel.

In the example of FIG. 4, the channel number subfield 731a may indicate one among the channels CH2 through CH6. If the WS channel number subfield 731a indicates one among the channels CH3 through CH5, the maximum transmit power may be given as 100 mW. If the WS channel number subfield 731a indicates one between the channels CH2 and CH6, the maximum transmit power may be given as 40 mW.

Figure 8:
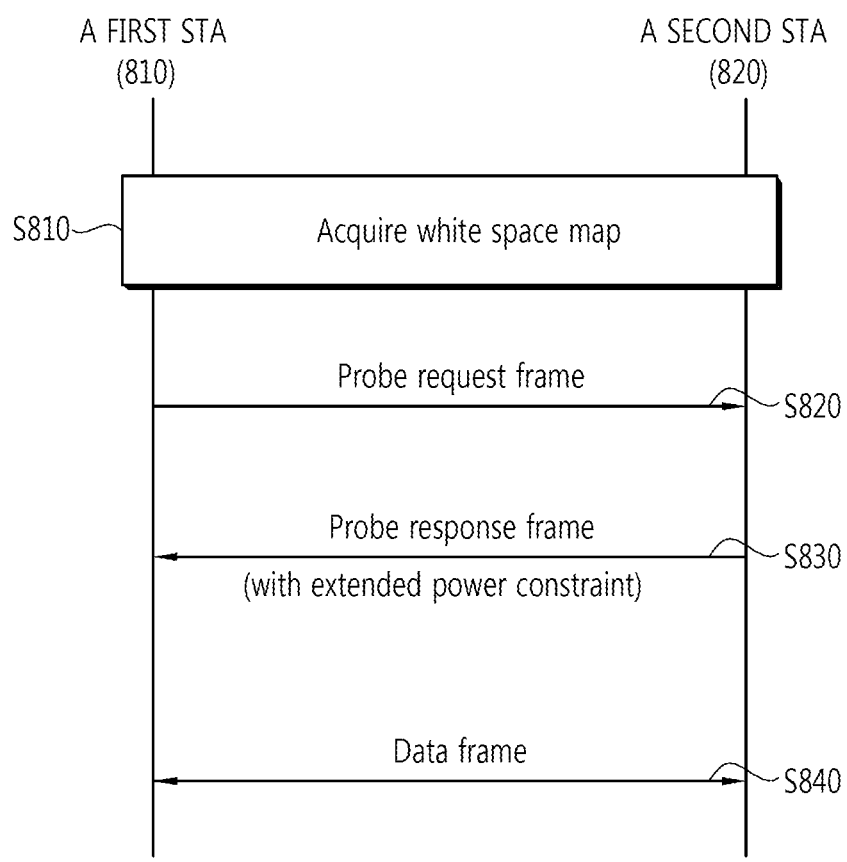
FIG. 8 is a flowchart showing a method for controlling a transmit power according to another exemplary embodiment of the present invention.

FIG. 8 is a flowchart showing a method for controlling a transmit power according to another exemplary embodiment of the present invention.

A first STA 810 and a second STA 820 acquire a white space map (S810). The white space map may be acquired based on TV channel information from TV bands database system or its own spectrum sensing. The second STA 820 which acquires the white space map may send the white space map to the first STA 810.

The first STA 810 transmits a probe request frame to the second STA 820 to initiate active scanning (S820).

As a response to the probe request frame, the second STA 820 sends a probe response frame including an extended power constraint to the first STA 810 (S830).

The first STA 810 and second STA 820 may receive and transmit data frames based on the extended power constraint (S840).

Figure 9:
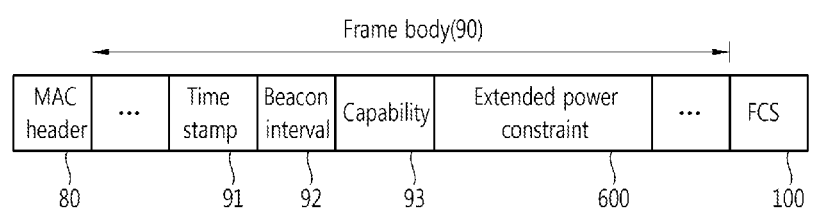
FIG. 9 is a block diagram showing a format of the probe response frame according to an exemplary embodiment of the present invention.

FIG. 9 is a block diagram showing a format of the probe response frame according to an exemplary embodiment of the present invention.

Referring to FIG. 9, a probe response frame includes a MAC header 80, a frame body 90 and a FCS 100.

The frame body 90 includes a timestamp field 91, a beacon interval field 92, a capability field 93, and an extended power constraint field 600. These fields are the same as the timestamp field 61, the beacon interval field 62, the capability field 63, and the extended power constraint field 600 shown in the embodiment of FIG. 6.

In the meantime, the available channel and the maximum allowable transmit power may be different depending on the types of STA. For example, the STA corresponding to a fixed device cannot use the WS channel adjacent to the WS channel being occupied by a licensed user. On the other hand, the STA corresponding to a personal/portable device can use the adjacent WS channel under the condition that the maximum transmit power is limited to a certain range, e.g., from 100 mW to 40 mW.

Accordingly, the STA can need to send the type of its own service-target STA.

Figure 10:
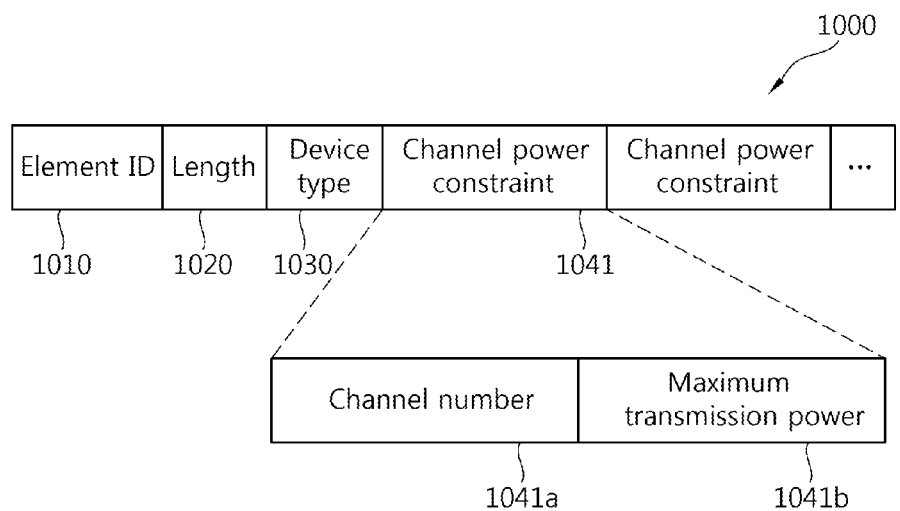
FIG. 10 is a block diagram showing an extended power constraint including a device type.

FIG. 10 is a block diagram showing an extended power constraint including a device type.

Referring to FIG. 10, an extended power constraint field 1000 includes an element ID field 1010, a length field 1020, a device type field 1030, and one or more channel power constraint fields 1040. The element ID field 1010 and the length field 1020 are the same as the fields 610 and 620 shown in the embodiment of FIG. 6.

The device type field 1030 indicates a type of a STA to be serviced by the AP. If there are two types of STA such as a fixed device and a personal/portable device, it is possible to distinguish the type of corresponding STA on the basis of a bit value that the device type field 1030 has. The device type field 1030 may indicate each type of STA, or a set of certain-typed STA. The size of the device type field 1010 may be varied depending on the types of STA.

The channel power constraint field 1041 includes a channel number sub-field 1041a and a maximum transmit power sub-field 1041b.

The extended power constraint field 1000 may be transmitted as being included in a beacon frame, a probe response frame, or other management frames.

The STA can be informed of whether the included information is for what type of device, by acquiring the extended power constraint field 1000. Also, the STA can be informed of the maximum transmit power allowable for the corresponding channel.

Figure 11:
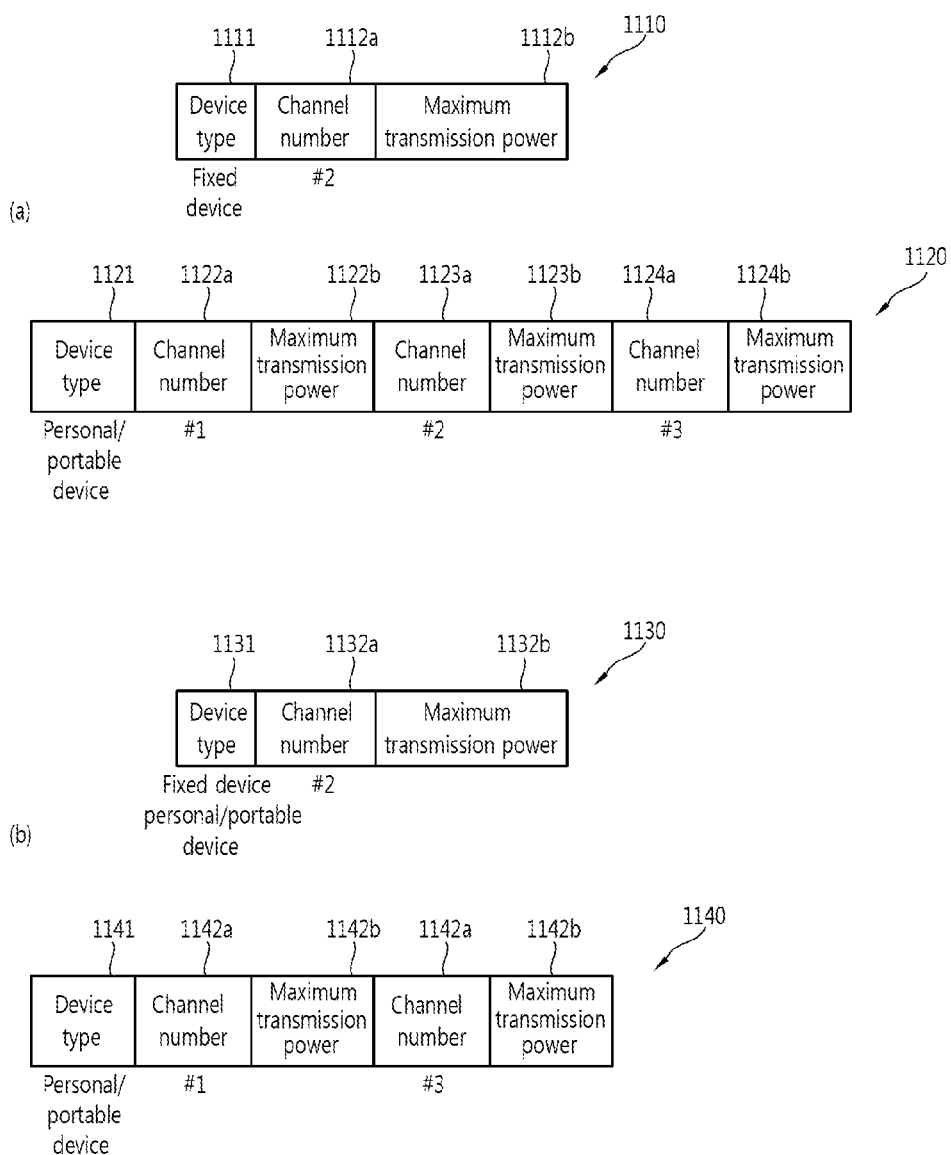
FIG. 11 is a block diagram showing examples of extended power constraint.

FIG. 11 is a block diagram showing examples of extended power constraint. Here, it is assumed that a WS channel #1 and a WS channel #3 are adjacent to the WS channel occupied by a licensed user. In this case, a STA corresponding to a fixed device can use only the WS channel #2, and the STA corresponding to a personal/portable device can use at least one of the WS channels #1, #2 and #3.

As shown in a subfigure (a) of FIG. 11, a channel power constraint fields about the WS channels available to the types of STA may be included in a extended power constraint fields, respectively. If a device type field 1111 indicates a STA corresponding to a fixed device, an extended power constraint field 1110 includes a channel power constraint field 1112 about the WS channel #2. If a device type field 1121 indicates a STA corresponding to a personal/portable device, an extended power constraint information field 1120 includes channel power constraint fields 1122, 1123, 1124.

As shown in a subfigure (b) of FIG. 11, a channel power constraint field about the WS channel available in common to the types of STA may be included in one extended power constraint information field, and the channel power constraint fields about the WS channel available to only the respective types of STA may be included in different extended power constraint information fields, respectively. If a device type field 1131 indicates a STA corresponding to a fixed device and a personal/portable device, an extended power constraint information field 1130 includes a channel power constraint field 1132 about the WS channel #2. If a device type field 1141 indicates a STA corresponding to a personal/portable device, an extended power constraint information field 1140 includes channel power constraint fields 1142 and 1143 about the WS channels #1 and #3.

Figure 12:
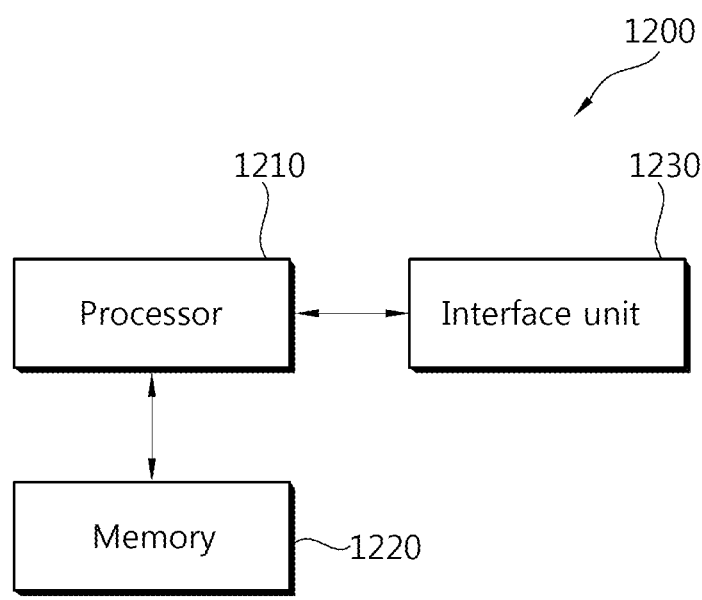
FIG. 12 is a block diagram of a wireless device to implement the present invention.

FIG. 12 is a block diagram of a wireless device to implement the present invention. The wireless device 1200 may be a part of a STA or an AP and may be a first STA or a second STA shown in embodiments of FIGS. 2, 5 and 8. The wireless device 1200 may operate in a TV WS.

The wireless device 1200 includes a processor 1210, a memory 1220 and an interface unit 1230.

The processor 1210 implements functions of the first STA or the second STA shown in embodiments of FIGS. 2, 5 and 8. The processor 1210 may acquire a white space map and generate an extended power constraint. The memory 1220 is operatively coupled with the processor 1210 and stores various information. The interface unit 1230 is operatively coupled with the processor 1210 and provides a wireless interface with other wireless device. The white space map and the extended power constraint may be transmitted via the interface unit 1230.

The processor may include application-specific integrated circuit (ASIC), other chipset, logic circuit and/or data processing device. The memory may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for controlling a transmit power of a first wireless device in a wireless local area network, the method comprising:
   transmitting a first frame comprising a transmit power information element comprising one or more maximum transmit power fields to a second wireless device; and
   receiving a second frame from the second wireless device;
   wherein the transmit power information element comprises maximum transmit power information for one or more channel bandwidths,
   wherein each of the one or more maximum transmit power fields defines a maximum transmit power for each of the one or more channel bandwidths, and
   wherein the transmit power information element comprises maximum transmit power information for all channel bandwidths supported by the first wireless device and the second wireless device.

2. The method of claim 1, wherein the transmit power information element comprises at least one of:
   a first maximum transmit power field defining maximum transmit power allowable in a bandwidth of a first size;
   a second maximum transmit power field defining maximum transmit power allowable in a bandwidth of a second size; and
   a third maximum transmit power field defining maximum transmit power allowable in a bandwidth of a third size.

3. The method of claim 1, wherein the first frame comprising the transmit power information element comprises a beacon frame or a probe response frame.

4. The method of claim 1, wherein the first frame comprising the transmit power information element is advertised by an access point.

5. The method of claim 1, wherein the transmit power information element is used for transmit power control.

6. A first wireless device for controlling a transmit power in a wireless local area network, the wireless device comprising:
   a memory; and
   a processor configured to:
      transmit a first frame comprising a transmit power information element comprising one or more maximum transmit power fields to a second wireless device; and
      receive a second frame from the second wireless device;
      wherein the transmit power information element comprises maximum transmit power information for one or more channel bandwidths,
      wherein each of the one or more maximum transmit power fields defines a maximum transmit power for each of the one or more channel bandwidths, and
      wherein the transmit power information element comprises maximum transmit power information for all channel bandwidths supported by the first wireless device and the second wireless device.

7. The method of claim 6, wherein the transmit power information element comprises at least one of:
   a first maximum transmit power field defining maximum transmit power allowable in a bandwidth of a first size;
   a second maximum transmit power field defining maximum transmit power allowable in a bandwidth of a second size; and
   a third maximum transmit power field defining maximum transmit power allowable in a bandwidth of a third size.

8. The method of claim 6, wherein the first frame comprising the transmit power information element comprises a beacon frame or a probe response frame.

9. The method of claim 6, wherein the first frame comprising the transmit power information element is advertised by an access point.

10. The method of claim 6, wherein the transmit power information element is used for transmit power control.

11. A method of controlling a transmit power of a first wireless device in a wireless local area network, the method comprising:
    transmitting a first frame comprising one or more maximum transmission power fields to a second wireless device; and
    receiving a second frame from the second wireless device,
    wherein a number of maximum transmission power fields included in the first frame is determined based on a number of channels available to the first wireless device,
    wherein each of the one or more maximum transmission power fields indicates an allowed maximum transmission power for each channel number to the first wireless device and the second wireless device, and
    wherein the second frame is received based on transmission power information indicated by maximum transmission power fields corresponding to channel numbers used by the first wireless device and the second wireless device.

12. The method of claim 11, wherein the one or more maximum transmission power fields comprises at least one of:
    a first maximum transmit power field defining maximum transmit power allowable in a first number;
    a second maximum transmit power field defining maximum transmit power allowable in a second number; and
    a third maximum transmit power field defining maximum transmit power allowable in a third number.

13. The method of claim 11, wherein the first frame comprising the transmit power information element comprises a beacon frame or a probe response frame.

14. The method of claim 11, wherein the first frame comprising the transmit power information element is advertised by an access point.

15. The method of claim 11, wherein the transmit power information element is used for transmit power control.

16. A first wireless device for controlling a transmit power in a wireless local area network, the wireless device comprising:
    a memory; and
    a processor configured to:
       transmit a first frame comprising one or more maximum transmission power fields to a second wireless device; and
       receive a second frame from the second wireless device,
       wherein a number of maximum transmission power fields included in the first frame is determined based on a number of channels available to the first wireless device,
       wherein each of the one or more maximum transmission power fields indicates an allowed maximum transmission power for each channel number to the first wireless device and the second wireless device, and
       wherein the second frame is received based on transmission power information indicated by maximum transmission power fields corresponding to channel numbers used by the first wireless device and the second wireless device.

17. The method of claim 16, wherein the one or more maximum transmission power fields comprises at least one of:
- a first maximum transmit power field defining maximum transmit power allowable in a first number;
- a second maximum transmit power field defining maximum transmit power allowable in a second number; and
- a third maximum transmit power field defining maximum transmit power allowable in a third number.

18. The method of claim 16, wherein the first frame comprising the transmit power information element comprises a beacon frame or a probe response frame.

19. The method of claim 16, wherein the first frame comprising the transmit power information element is advertised by an access point.

20. The method of claim 16, wherein the transmit power information element is used for transmit power control.

\* \* \* \* \*